United States Patent [19]

Edming

[11] 4,034,452

[45] July 12, 1977

[54] ROUTER BIT

[76] Inventor: J. Walter Edming, S. End Edming Road, P.O. Box 83, Glen Flora, Wis. 54526

[21] Appl. No.: 676,330

[22] Filed: Apr. 12, 1976

[51] Int. Cl.² .......................................... B26D 1/12
[52] U.S. Cl. .............................. 29/103 A; 408/226
[58] Field of Search ......... 29/103 A; 408/216, 218, 408/223, 226

[56] References Cited

U.S. PATENT DOCUMENTS

| 843,376 | 2/1907 | Tombragel et al. | 29/103 A |
| 2,529,157 | 11/1950 | Higerd | 29/103 A |
| 3,303,862 | 2/1967 | Westenberger | 29/103 A |

Primary Examiner—Leonidas Vlachos
Attorney, Agent, or Firm—Warren A. Sturm; James R. Haller; Hugh D. Jaeger

[57] ABSTRACT

An improved router bit that has numerous advantages over conventional router bits; the bit of the present invention allowing chips to fall through quite readily, making a smoother cut and having other advantages; the bit having two or more flutes, one of the flutes having a cutting edge with a radius of conventional bits, the other flute or flutes being radially shorter, thus giving such flute or flutes a less circular limit.

10 Claims, 4 Drawing Figures

ROUTER BIT

This invention relates generally to router bits.

A principal object of the present invention is to provide a router bit, which additionally, to at least one or more conventional flutes, includes at least one or more other flutes, that are radially shorter, so that the outer edge thereof follows a circular path of a smaller size, thus resulting in chips falling through quite readily.

Another object is to provide a router bit, that uses less effort in pushing the wood into the cutting bit.

Still another object is to provide a routing bit, which makes a smoother cut.

Still a further object is to provide a router bit, wherein there is less friction and much less heating of the bit caused by back pressure on the bit trying to overcome compaction of the chips in the cut.

Still a further object is to provide a router bit, wherein the bit stays sharper a much longer period of time.

Other objects are to provide a router bit, which is simple in design, inexpensive to manufacture, rugged in construction, easy to use and efficient in operation.

These and other objects will be readily evident upon a study of the following specification and the accompanying drawing, wherein.

Figure 1:
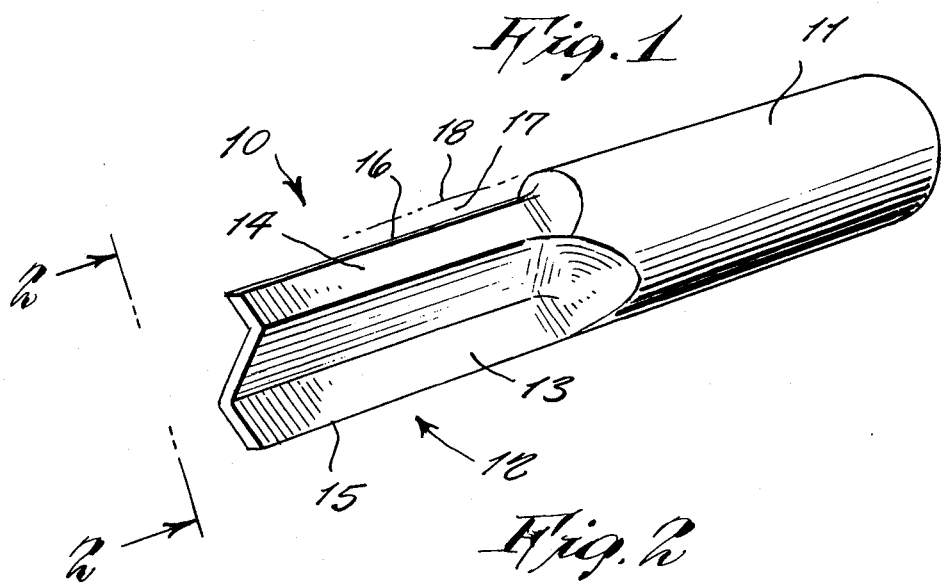
FIG. 1 is a perspective view of the present invention.
Figure 2:
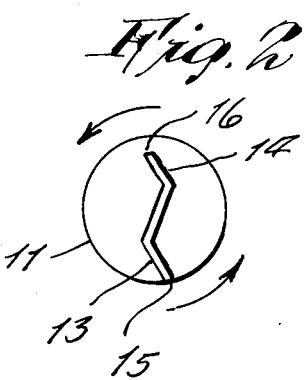
FIG. 2 is an end view thereof, as viewed on line 2—2 of FIG. 1.

Referring now to the drawing in greater detail, and more particularly to FIGS. 1 and 2 thereof at this time, the reference numeral 10 represents a router bit according to the present invention, wherein there is an elongated straight shank 11 for being fitted into a chuck of a machine, and one end of the shank being integral with a routing head 12.

The routing head 12 includes at least two or more flutes, as shown, so that it includes at least one conventional flute 13, and a special flute 14, which is significant of the present invention.

As viewed in FIG. 2, it is to be noted that the conventional flute 13 extends radially a greater distance than the flute 14, so that the outer edge 15, of flute 13, travels a larger circular path than the outer edge 16 of the flute 14. Accordingly, the outer edge 15, of the flute 13, thus cuts and forms the cylindrical side wall of an opening for a side wall of a groove, that is being cut by the bit 10. It is thus also apparent that the edge 16, of the flute 14, does not accomplish this task. The radially shorter flute 14 thus results in a creation of a space 17 being formed, between the edge 16 and a side edge 18 of an opening, groove or the like, which is formed by the edge 15.

In operative use, the router bit 10 rotates about a longitudinally central axis of the shank 11, so that as shown in FIG. 2, the edge 15 travels on a larger circular path than the edge 16. This results in the chips falling through quite readily, less effort being used to push the wood into the cutting bit, making a smoother cut, less friction and less heating of the bit being caused by back pressure of the bit trying to overcome compaction of the chips in the cut, ad the bit staying sharper a much longer period of time.

Figure 3:
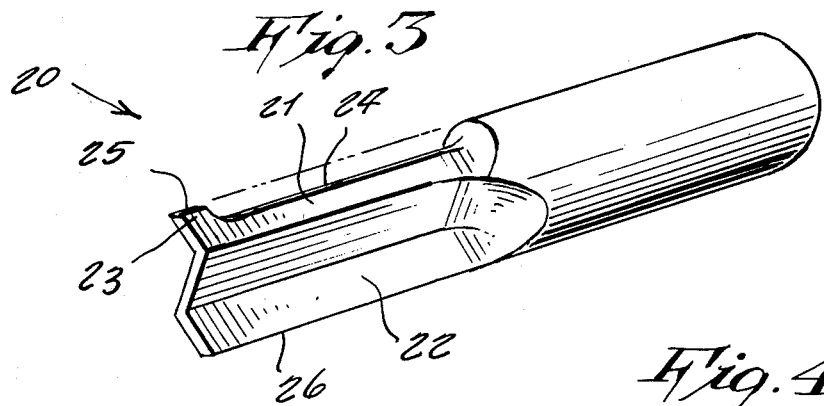
FIG. 3 is a perspective view of a modified design of the invention.

Reference is now made to FIG. 3 of the drawing, wherein there is a modified design of router bit 20, which is generally identical to the above described router bit 10, except that in this form of the invention, the flute 21, which is radially shorter than the conventional flute 22, includes a tip portion 23, which extends radially outwardly a greater distance than the remaining outer edge 24 of the flute 21, the outer side edge 25 of the tip portion 23, travelling on a same circular path as the outer edge 26 of the flute 22. The tip portion thus serves as a guide or pilot, in order to prevent the router bit of narrower diameter to bend axially, and produces a groove or opening that is not precise in widths or true in location. This is because the tip portion serving as a guide or pilot, thus prevents the router bit from bending actually even the slightest amount. Thus a modified design of the invention is provided.

Figure 4:
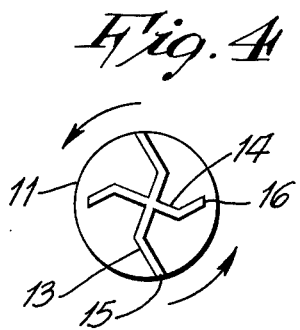
FIG. 4 is an end view thereof of another embodiment of the invention as viewed on line 2—2 of FIG. 1.

It is to be clearly understood that the router bit can have one, or possibly more, of the radially shorter flutes, and in a router bit having a larger number of the flutes, such radially shorter flutes may be positioned either alternately between the other conventional flutes as shown in FIG. 4, or else adjacent to each other.

While various changes may be made in the detail construction, it is understood that such changes will be within the spirit and scope of the present invention as is defined by the appended claims.

I claim:

1. A router bit for use in a routing machine to route a work piece comprising;
   a. an elongated straight shank having one end adapted to fit into a chuck of said machine;
   b. a routing head integral with and at the other end of said shank having one conventional flute and an opposing shorter flute of length less than the radius of said conventional flute; and
   c. a tip portion extending from said opposing flute extending radially outward from said shorter flute equal to the radius of said shank whereby said router bit permits routed chips to fall readily through said workpiece while making a smooth cut, requiring minimal effort in routing in addition to reduced friction, heat, and back pressure in said router bit attempting to overcome compaction of said material resulting in said router bit maintaining its sharpness.

2. A router bit of claim 1 wherein the length of said conventional flute is greater than the radius of said shank.

3. A router bit of claim 1 wherein the length of said conventional flute is equal to the radius of said shank.

4. A router bit of claim 1 wherein the length of said convention flute is less than the radius of said shank.

5. A router bit of claim 1 further comprising a plurality of conventional flutes.

6. A router bit of claim 1 further comprising a plurality of shorter flutes.

7. A router bit of claim 1 further comprising a plurality of conventional and shorter flutes being positioned adjacent to each other.

8. A router bit of claim 1 further comprising a plurality of conventional and shorter flutes, said conventional and shorter flutes being alternately spaced on said shank.

9. A router bit of claim 1 wherein said tip portion is located in the middle of the length of said shorter flute.

10. A router bit of claim 1 wherein said tip portion is located at the end of said shorter flute.

* * * * *